United States Patent [19]

Bossler, Jr.

[11] Patent Number: 5,125,756

[45] Date of Patent: * Jun. 30, 1992

[54] ROLLER BEARING WITH LOAD-REACTED CAGE

[75] Inventor: Robert B. Bossler, Jr., Hacienda Heights, Calif.

[73] Assignee: Lucas Western, Inc., City of Industry, Calif.

[*] Notice: The portion of the term of this patent subsequent to Dec. 4, 2007 has been disclaimed.

[21] Appl. No.: 606,774

[22] Filed: Oct. 31, 1990

Related U.S. Application Data

[63] Continuation-in-part of Ser. No. 456,950, Dec. 26, 1989, Pat. No. 4,974,972.

[51] Int. Cl.$^5$ ............................................. F16C 33/46
[52] U.S. Cl. ..................................................... 384/572
[58] Field of Search ................ 384/571, 576, 578, 572, 384/614

[56] References Cited

U.S. PATENT DOCUMENTS

| | | |
|---|---|---|
| 2,430,359 | 11/1947 | Messinger . |
| 2,607,641 | 8/1952 | Messinger . |
| 2,628,137 | 2/1953 | Ashton . |
| 2,734,786 | 2/1956 | McNicoll . |
| 3,275,391 | 9/1966 | Blais . |
| 3,361,501 | 1/1968 | Messinger et al. . |
| 3,517,975 | 6/1970 | Lonngren et al. . |
| 4,065,192 | 12/1977 | Sague . |
| 4,479,683 | 10/1984 | Kanamaru .......................... 384/619 |
| 4,606,654 | 8/1986 | Yatsu et al. ........................ 384/447 |
| 4,746,232 | 5/1988 | Gugel ................................. 384/619 |
| 4,755,065 | 7/1988 | Walter et al. ...................... 384/447 |
| 4,812,058 | 3/1989 | Hofmann et al. ................... 384/572 |
| 4,834,560 | 5/1989 | Jacob et al. ........................ 384/571 |

OTHER PUBLICATIONS

*Bearing Design*, "Two Row Bearings", (1972).
Timken Brochure, "The Timken Crossed Roller Bearing", (no date).

*Primary Examiner*—Lenard A. Footland
*Attorney, Agent, or Firm*—Pretty Schroeder Brueggemann & Clark

[57] ABSTRACT

A roller bearing includes a slotted cage structure that separates and controls tapered rollers as they roll on the bearing races. The cage is a load-bearing structure that is in sliding contact with the larger diameter axial end surface of the rollers, thereby preventing any sliding contact between the bearing races and the axial ends of the rollers. The point of sliding contact between the cage and the rollers can be selected for minimizing friction. The roller bearing can be provided in either a crossed roller bearing configuration or in a multiple row configuration.

11 Claims, 4 Drawing Sheets

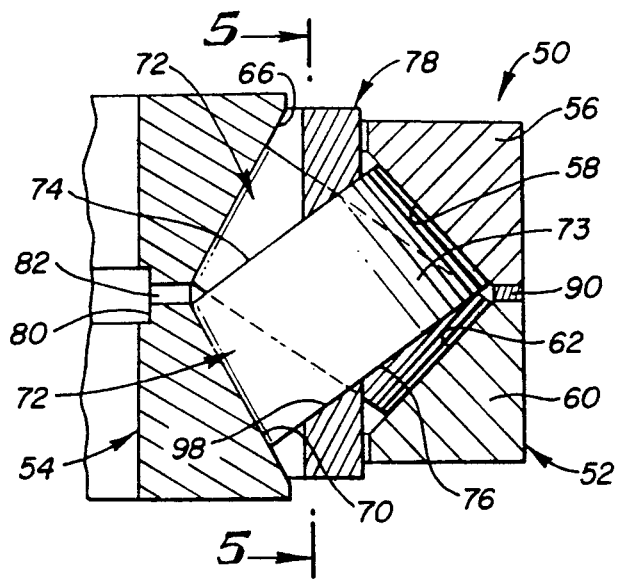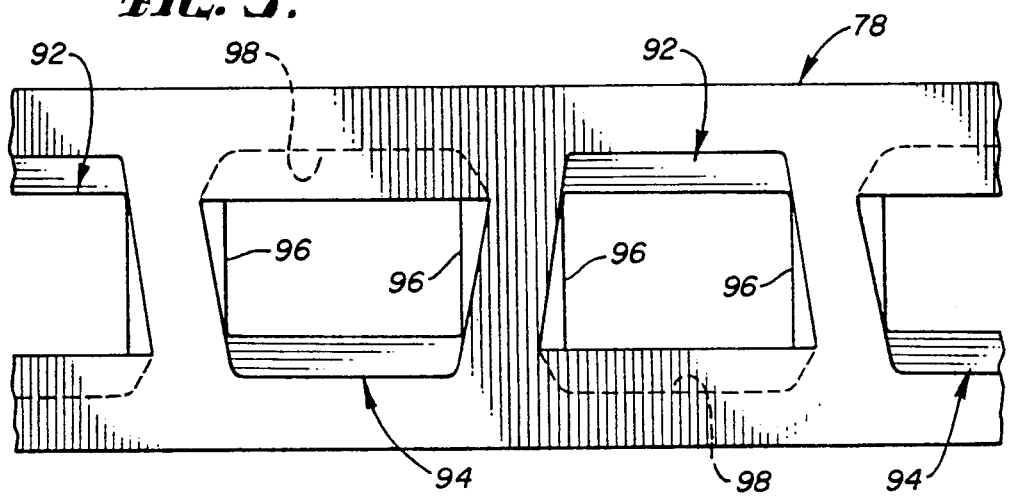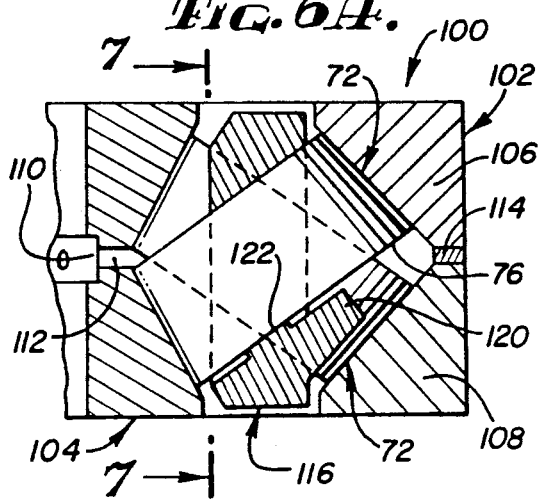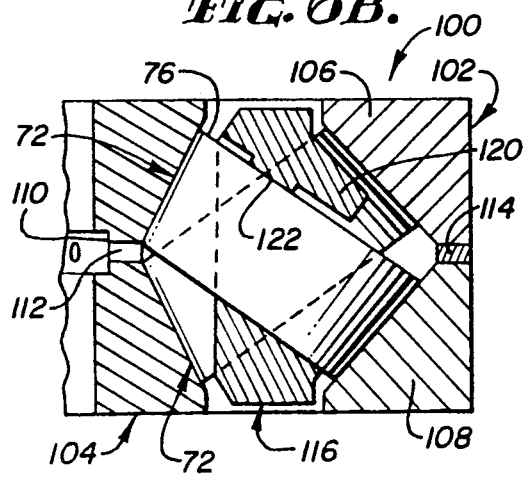

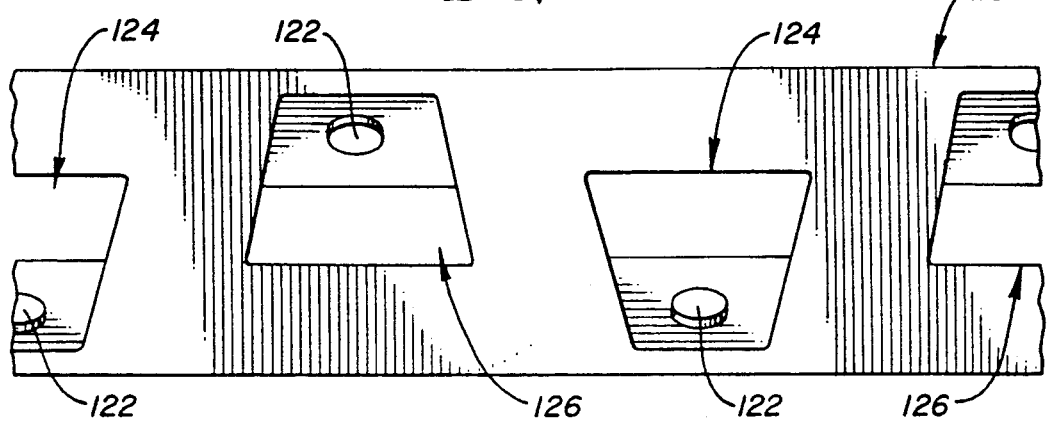
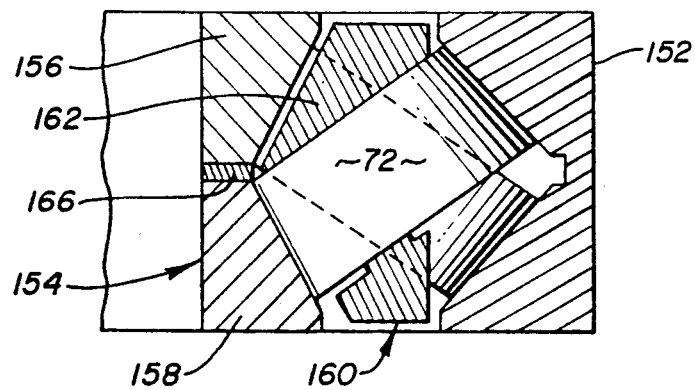

ROLLER BEARING WITH LOAD-REACTED CAGE

CROSS-REFERENCE TO RELATED APPLICATION

This is a continuation-in-part of application Ser. No. 07/456,950 filed Dec. 26, 1989, now Pat. No. 4,974,972.

BACKGROUND OF THE INVENTION

1. Field of the Invention

This invention relates generally to bearings and, more particularly, to roller bearings that include a cage structure with slots for receiving the bearing rollers.

2. Description of the Related Art

Roller bearings reduce friction between two bodies, one or both of which are rotating. Roller bearings include an outer ring and an inner ring that define an annular space in which a group of rollers can roll, orbiting about the bearing axis. The outer ring is attached to one of the bodies, and the inner ring is attached to the other body. The roller bearing reduces friction resulting from relative rotational movement between the inner ring and outer ring. The friction is reduced by rotation of the rollers in the annular space on ring surfaces known as races. The bearing transmits bearing axial and radial loads from one ring to the other through the rollers. Often, roller bearings use tapered rollers that have a conical cylindrical shape, with one end face having a larger diameter than the other. When a radial load is applied to a conical roller, the conical shape causes the roller to experience an axial load.

In a conventional roller bearing, the rollers are kept in the annular space between the races by shoulders protruding from the circumferences of one of the rings. The roller axial loads are transmitted along the longitudinal axes of the rollers, and out the large diameter roller end faces to one of the shoulders protruding from the circumference of the other ring. This is known as end loading of the rollers. A conventional bearing can also include a slotted cage structure that keeps the rollers separated from each other, so they do not collide as they roll, and that orbits with the rollers.

There necessarily is sliding contact between the shoulder of the race and the large diameter end face of each roller as the roller rolls along the race, because the roller end face abuts the shoulder as the roller rotates. The sliding contact creates friction, which produces heat and reduces the survivability of the bearing. It is important to control friction, because it can quickly generate enough heat to disintegrate a bearing. If a bearing doesn't have enough lubrication to control the friction, the friction can produce enough heat to destroy the bearing, and there will be an abrupt halt to rotation.

It is sometimes necessary to react bearing loads in more than one axial direction, and in this circumstance either a crossed roller bearing or multiple rows of alternately-inclined bearings are necessary. The great advantage of crossed roller bearings is that they only require the space of a single-row bearing. Crossed roller bearings include alternatingly-inclined rollers in a single row, and allow the crossed roller bearing to handle axial loads in the manner of a multiple single-row bearing. That is, a crossed bearing with a single row of alternatingly inclined rollers performs the work of multiple single-row bearings. A detrimental aspect of a crossed roller bearing is that the end faces of one set of alternating rollers are in sliding contact with the race used by the oppositely inclined set of rollers, and therefore the races are subjected to both rolling and sliding forces, and can become scarred and pitted. Crossed roller bearings also generally have a greater amount of friction to contend with, and are not suitable for speeds as high as those of conventional roller bearings.

Thus, in the case of either a conventional tapered roller bearing or a conventional crossed roller bearing, friction is generated at the point of contact between the roller end face and the load-bearing ring surface (either the ring shoulder or the race, respectively). The friction decreases the maximum bearing speed, reduces the survivability of the bearing, increases the lubrication requirements, and limits the applications for which the bearing is suitable.

From the foregoing discussion, it should be apparent that there is a need for a roller bearing that provides a reduced amount of friction while reacting conical roller axial loads. The present invention satisfies this need.

SUMMARY OF THE INVENTION

The present invention is embodied in a roller bearing in which the roller axial loads generated from conical rollers operating in one set of inclined races are reacted through a cage structure to another set of rollers operating in oppositely inclined races. Thus, the cage is an integral load-bearing structure of the bearing, in addition to keeping the rollers separated to prevent collisions and ensure proper spacing. Using the area of roller-to-cage contact to bear the axial load reduces the sliding velocity and can allow the area of sliding contact to be reduced to a relatively small area, thereby reducing the amount of friction in the bearing, and allows the cage material to be selected from a friction-reducing material that is not necessarily suited as a race material. The concept can be applied to multiple-row bearings, and also to crossed roller bearings. In both cases, either the outer ring or the inner ring must be split into two halves.

For a two-row bearing, where bearing loads from opposite directions will be reacted, the rollers can be oriented face-to-face, in two parallel rows with their large end faces near each other and separated by the cage. In such an arrangement, roller axial loads can be reacted from one set of rollers, through the cage, to the other set of rollers and to the neighboring race. Because the rollers are placed end-to-end, in two parallel rows, the included angle of each bearing row, or the angle between each respective inner race and outer race, can be reduced. This reduces the induced thrust that tends to push the rollers in a direction out their large end faces, reduces friction and therefore allows a higher rotational speed for the bearing, and also results in a more compact bearing. In such a two-row bearing, the cage can be constructed as two separate pieces, separated by a spacer to reduce friction, and can be provided with oil passage notches for improved lubrication. In a two-piece cage arrangement, each cage portion can rotate at a speed slightly different from the other, further reducing friction in the bearing.

A crossed roller bearing in accordance with the present invention includes a bearing cage that separates and controls the rollers, and supports their large diameter axial ends. There is no sliding contact between the rollers and any of the races. There is sliding contact between the large diameter axial end surfaces of the rollers and a contact area of the cage. The bearing further includes two sets of oppositely inclined rollers that transmit opposed forces to the cage. In accordance with the present invention, the cage is a strong onepiece structure. Forces that are axially directed along the rollers are reacted by the cage, while radially directed forces on the roller are directed to the races via the roller peripheral surfaces. Different materials may be selected for construction of the cage so as to reduce friction and enhance lubrication.

In accordance with the present invention, forces directed outwardly from the large diameter roller axial end surface are borne by the roller cage at a contact area of the cage. The material selected for construction of the cage advantageously has superior load bearing qualities. For example, silver-plated steel has been found to be an excellent material for cages. The cage is a slotted structure that fits into the annular space defined by the bearing races. The cage may be given a cross-sectional shape such that it extends into the annular space defined by the bearing races and in-between the rollers. This increases the size of the cage, and therefore its load carrying capability. Dividing either the outer race or the inner race into two halves allows this increase in cage size. The contact area of the cage with the axial end surface of the rollers can be selected to provide the minimum amount of friction between the rollers and the races for the projected rotational speed of the bearing.

The inner race of the bearing may be provided with a plurality of radial holes that provide a flow of lubricating fluid, such as oil. Centrifugal force of the spinning bearing will naturally drive the lubricating oil from the inner race, over the peripheral surface of the rollers, and to the outer race. The space between the outer races provides a convenient location for lubricating oil drainage holes.

Other features and advantages of the present invention should be apparent from the following description of the preferred embodiment, taken in conjunction with the accompanying drawings, which illustrate, by way of example, the principles of the invention.

BRIEF DESCRIPTION OF THE DRAWINGS

FIG. 4 is a cross-sectional view of the crossed roller bearing illustrated in FIG. 3.

FIG. 5 is a laid-out view of the roller cage illustrated in FIGS. 3 and 4.

FIG. 6 is a cross-sectional view of a second preferred embodiment of a crossed roller bearing in accordance with the present invention.

FIG. 7 is a laid-out view of the roller cage illustrated in FIG. 6.

FIG. 8 is a cross-sectional view of another preferred embodiment of the present invention.

DESCRIPTION OF THE PREFERRED EMBODIMENTS

Figure 1:
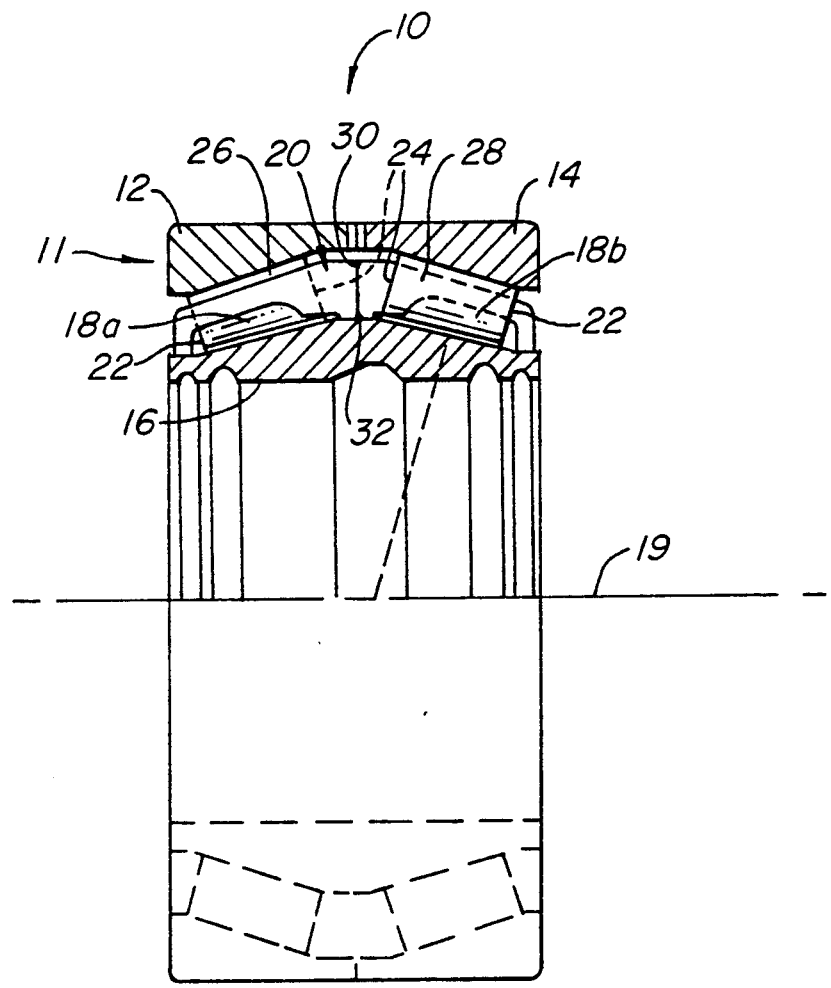
FIG. 1 is a side sectional view of a two-row bearing in accordance with the present invention.

A two-row bearing 10 in accordance with the present invention is illustrated in FIG. 1 and includes a split outer ring 11 having a first half 12 and a second half 14 that are capable of movement together relative to a single-piece inner ring 16 and that are separated from the inner ring by a plurality of tapered rollers 18, which orbit about the bearing axis 19. The rollers receive bearing loads from the rings and react their axial loads to a load-bearing cage 20. That is, axial loads are transmitted to the cage by sliding contact between the roller end faces and the cage. The total area of sliding contact between the rollers and the cage may be reduced from the total contact area available. The selection of contact area by the present invention's load-bearing cage can advantageously reduce friction in the bearing, increase the survivability of the bearing, and improve operation.

The rollers shown in FIG. 1 are arranged in two rows 18a and 18b, have a small diameter end face 22 and a large diameter end face 24, and are oriented end-to-end, with their large end faces facing each other. The rollers roll about the bearing axis 19 in two axially separate orbits, or paths. An induced thrust on the rollers 18 is a result of loads from the races on the rings 12, 14, and 16 acting on the rollers, and is directed along the rotational axes of the rollers out the large diameter end faces 24. This is a condition known as end loading of the rollers. The loads transmitted to the rollers from the races tend to push the rollers in a direction out their large diameter end faces 24, a phenomenon known as induced thrust. The end-to-end configuration of the rollers places the large diameter end faces toward each other, which allows the included angle between the inner ring 16 and outer rings 12 and 14 to be smaller than they would be otherwise and reduces the induced thrust. This allows the rollers to be made with less taper, such that they are more nearly cylindrical, and can roll faster with reduced friction. The decreased roller taper allows a smaller, more compact bearing that can rotate at an increased speed.

Under some axial loads, a two-row bearing such as that illustrated in FIG. 1 would experience reduced friction if the two rows of rollers 18a and 18b could rotate at slightly different speeds, possibly because of manufacturing discrepancies. To accommodate this, the cage 20 can advantageously be of split construction, as shown in FIG. 1, in which the cage is shown comprised of a first half 26 and a second half 28. The split cage construction allows the two cage halves to rotate at independent speeds, which further reduces friction in the bearing 10. As shown in FIG. 1, the cage halves can be separated by a spacer 30 that further reduces friction between the cage halves. The spacer can be of a different material from the cage halves and, for example, can be constructed of steel where the cage halves 26 and 28 are constructed of bronze. The spacer can include notches 32 that allow lubricating oil to pass, further reducing friction in the bearing. Reduced friction eases the lubrication requirements of the bearing and improves its reliability and survivability.

Figure 2:
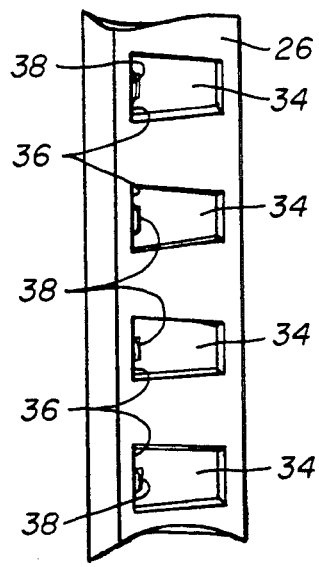
FIG. 2 is a laid-out view of one of the roller cages illustrated in FIG. 1.

The area of sliding contact between the roller end faces 24 and the load-bearing surfaces can be reduced when compared with conventional bearings. In a conventional roller bearing, the end face of each roller slides along a shoulder extending from one of the rings or, in the case of a crossed roller, slides all along the race used by the alternatively inclined set of rollers. A laid-out view of a portion of one roller cage half 26 in accordance with the present invention, as illustrated in FIG. 2, shows that the cage half includes a plurality of slots 34 adapted to accept and support a roller 18. Each slot includes a shoulder 36 that serves as the area of contact to bear loads transmitted by the roller. The cage material can be selected so as to reduce friction, without concern for its suitability as a race material.

In the preferred embodiment shown in FIG. 2, the actual area of sliding contact between the rollers and the cage is further reduced by providing a raised button 38 on the cage shoulder 36. The load-bearing sliding contact in the roller bearing occurs between the raised button 38 and the roller large diameter end faces 24. The raised button presents an area of sliding contact even smaller than the cage shoulder, and therefore further decreases the friction in the bearing.

Figure 3A:
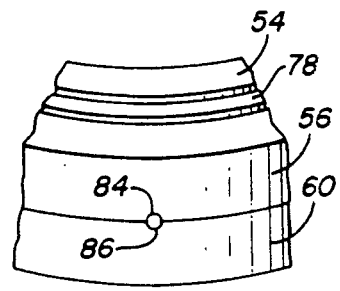
FIG. 3 is a cut-away perspective view of a first preferred embodiment of a crossed roller bearing in accordance with the present invention.
Figure 3:
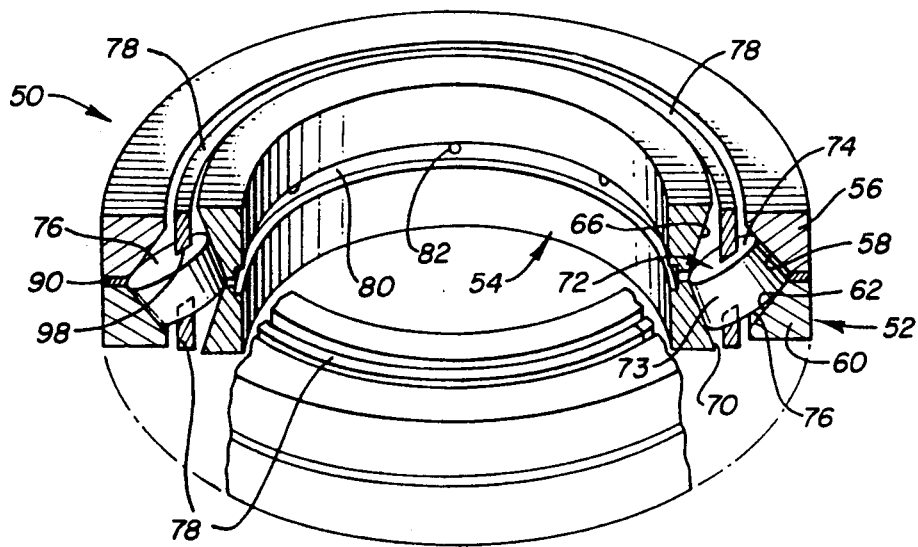

FIG. 3 shows a cut-away perspective view of a crossed roller bearing 50 in accordance with the present invention. The crossed roller bearing includes an outer ring 52 and an inner ring 54. The outer ring is constructed so as to be a split ring. Thus, the outer ring comprises an upper portion 56 with an inclined surface defining a race 58 and a lower portion 60 with an inclined surface defining a race 62. The inner ring has an outer circumference with a V-shaped groove having an upper inclined surface defining a race 66 and a lower inclined surface defining a race 70. When the inner and outer rings are placed adjacent each other in a concentric fashion, the races define an annular space for rollers.

In the annular space between the races, a plurality of tapered roller bearings 72 are placed. Being tapered, the rollers have a smaller diameter axial end surface 74 and a larger diameter axial end surface 76. The rollers have a smooth peripheral surface 73, and rotate about their longitudinal axis. As with all tapered roller bearing designs, the roller peripheral surface forms a cone whose apex is located on the bearing axis of revolution. Loads on the bearing 50 are transmitted through the races to the rollers. As a result, forces acting on the rollers tend to push each roller outwardly along its longitudinal axis. The rollers are preferably alternatingly inclined with respect to each other. That is, each roller will be located between adjacent rollers whose axes of rotation are inclined with respect to its axis of rotation. The number of rollers inclined in one direction, however, may depend on the particular application and there may be an unequal number of rollers inclined in each direction. For example, if bearing loads are expected to come primarily from one axial direction, it may be preferable to have twice as many rollers inclined in one direction as in the other.

A slotted cage structure 78 is located between the outer ring 52 and inner ring 54 and extends into the annular space between the rings. The cage serves to separate and control the rollers 72, and bears the force directed outwardly from the large diameter axial ends 76. The cage is preferably constructed as a single piece, as shown in FIG. 3, but can also be formed in segments. A single-piece construction provides improved strength and smoother rotation.

The inside peripheral surface of the inner ring 54 is provided with a centrally located groove 80. The groove has a plurality of spaced apart radial holes 82. These holes provide a path for lubricating oil to enter the bearing and provide lubrication to the rollers. As the inner race rotates, centrifugal force tends to pull the lubricating oil between the annular space between the bearing races from the inner races 66, 70 toward the outer races 58, 62. Radial slots may be provided in the outer ring 52, providing an exit path for the lubricating oil. For example, slots 84, 86 may be provided on the edge of the outer ring halves 56 and 60, as illustrated in FIG. 3a. When the outer ring halves are assembled, the semi-circular slots 84, 86 provide an exit path for the lubricating oil.

A shim 90 in the form of a flat ring may be located between the upper and lower outer ring halves 56 and 60. In some applications, a shim will be unnecessary. Depending on the size of the bearing and the application, it may be desirable to provide varying amounts of spacing between the upper and lower outer ring halves 56 and 60. This spacing may be provided by selecting a shim of suitable thickness, or by selecting several shims of suitable total thickness. The shim may alternatively be provided in the form of a split ring, a plurality of flat rings, or a plurality of curved segments that fit between the upper and lower outer ring halves 56, 60.

The roller bearing illustrated in FIG. 3 is shown in cross-section in FIG. 4. As noted, each of the rollers 72 is a tapered roller and, therefore, has a smaller diameter at one axial end surface 74 than at its other axial end surface 76. Axial, radial, and moment loads on the bearing 50 generate forces perpendicular to the races and directed to the rollers in the annular space between the inner and outer rings.

A view of a section of the cage 78, laid out flat, is shown in FIG. 5. The cage comprises a ring with a plurality of slots that are arranged into two sets. One set of slots 92 are configured for accepting rollers 72 inclined in one direction, while an alternate set of slots 94 are configured to accept rollers 72 inclined in another direction. Each one of the slots 92, 94 has four surfaces that are adjacent a roller 72 in the assembled bearing. Two side surfaces 96 of each slot are adjacent and in light contact with the peripheral surfaces 73 of the roller. A load bearing surface 98 of each slot is in sliding contact with the large diameter axial end surface 76 of each roller. The large diameter axial end surface of the roller presses against the load bearing surface of the cage, thereby distributing the bearing loads into the cage rather than against the races. The remaining side of the cage slot is only in light contact with the roller small diameter end surface 74.

The cage can be constructed from any high strength material, such as steel. The steel can be plated with silver for reduced friction, increased lubrication, and better heat conductivity. These qualities are especially important in high speed applications. Bronze alloys can also be used for the cage, as well as sintered steel impregnated with a lubrication agent. The impregnated lubrication agent is especially useful where the bearing may have to operate for a time with no lubricating oil. The particular application of the bearing will dictate the material used for the cage, as known to those skilled in the art.

In an alternate preferred embodiment of the present invention, shown in FIG. 6, a crossed roller bearing 100 includes an outer ring 102 and an inner ring 104, with FIG. 6A showing one roller and FIG. 6B showing an oppositely inclined roller. The outer ring is of a split design, having an upper portion 106 and a lower portion 108. The inner ring is a one piece design, with the sectional view showing a lubricating groove 110 and a lubricating radial hole 112. A shim 114 provides the needed separation between the upper and lower outer ring halves. These elements are similar to those described in the previous embodiment of FIGS. 2–4. The embodiment of FIG. 5, however, includes a cage structure 116 that is adapted to utilize as much of the annular space between the bearing rings as practical. Therefore, the cage includes a raised portion 120 that extends into the annular space between the rings toward the split outer ring 102. This added mass of material adds strength to the cage. There can be no similar extension of material into the opposite annular space because the inner ring is not split. During assembly of the bearing, the cage is slid into position past the inner ring and must clear the top of the inner ring. As with the previous embodiment, the reactive forces from the rollers are directed to the cage 116, with no sliding contact by the rollers with any of the races.

As shown in FIG. 6, the cage 116 is provided with a raised button 122, which has sliding contact with the large diameter axial end surface 76 of each roller 72. The button may be positioned such that sliding contact with the roller occurs at a predetermined spot 124 on the roller axial end surface. The predetermined spot can be selected to provide the minimum friction at the anticipated rotational speed of the bearing. The button may be selected to place the point of sliding contact with the roller axial end surface 76 anywhere from the axis of rotation to the outer edge of the axial end surface. If the point of contact is selected to be at the axis of rotation, the linear speed of the point of sliding contact with the cage will be very small. The greatest relative speed at the point of sliding contact will be where the button on the cage is located near the edge of the axial end surface. As known to those skilled in the art, the minimum lubricated friction occurs at a linear speed of approximately 10 feet per second. In the embodiment illustrated in FIG. 6, the button 122 is placed at a point where sliding contact with the roller 72 will be at the speed of lowest friction. For other applications, with differently sized bearings and different rotational speeds, the button 122 may have a location different from that shown in FIG. 6 for lowest friction. The placement of the button is well within the abilities of those skilled in the art, in view of this description. The button can be a raised portion of the cage or can be an insert pressed into a recess in the cage.

A section of the cage 116 laid flat is shown in FIG. 7. The cage is provided with a plurality of slots having an alternating configuration for the oppositely inclined rollers, one set of slots 124 being for one set of rollers and the alternate set of slots 126 being for the oppositely inclined rollers. Each slot includes a raised button 122 that provides the point of contact with each respective roller.

In yet another crossed roller bearing 150 shown in FIG. 8, also in accordance with the present invention, the outer ring 152 is of a single-piece construction, while the inner ring 154 is of a split ring configuration, having an upper half 156 and a lower half 158. Thus, the arrangement of the rings is the reverse of that shown in FIG. 6. Which one of the rings is split depends on the particular application. The cage 160 is essentially that shown in the previous embodiment, considering that the bearing is always constructed such that the bearing loads reacting through the races always tend to force the tapered rollers outwardly. Therefore, the outer ring will always have the deeper groove, regardless of whether or not it is of split construction. To utilize as much of the annular space between the bearing rings as practical, the cage includes an extended portion 162 that extends into the annular space toward the inner ring 154. The added mass of material adds strength to the cage. There can be no similar extension into the opposite annular space because the outer ring is not split, and during assembly the cage must slide into position and clear the top of the outer ring. Again, a shim 166 may be used to provide proper spacing between the split ring inner halves.

The present invention has been described above in terms of a presently preferred embodiment so that an understanding of the present invention can be conveyed. There are, however, many configurations for bearings and cages not specifically described herein, but with which the present invention is applicable. In a two-row bearing, for example, the rollers might be oriented with their small diameter end faces adjacent each other, rather than in the large diameter end-to-end orientation shown. The present invention should therefore not be seen as limited to the particular embodiment described herein, but rather, it should be understood that the present invention has wide applicability with respect to bearings of a wide variety of sizes and constructions. Such alternate configurations can be achieved by those skilled in the art in view of the descriptions herein.

I claim:

1. A roller bearing having an outer race and an inner race, the two defining an annular space within which can roll a plurality of tapered rollers each having a large end face and a small end face, the bearing further comprising:
    a cage having a plurality of slots that each include a shoulder adapted to receive the large diameter ends of the rollers, such that one end face of each roller abuts a cage shoulder and the cage shoulders receive axial loads from the rollers.

2. A roller bearing having an outer race and an inner race, the two defining an annular space within which can roll a plurality of tapered rollers each having a large end face and a small end face, the bearing further comprising:
    a cage having a plurality of slots that each include a shoulder adapted to receive the large diameter ends of the rollers, such that the cage shoulders receive axial loads from the rollers;
    wherein each cage shoulder includes a raised button that is adapted to be in sliding contact with a large diameter end of a roller.

3. A roller bearing as defined in claim 1, wherein the rollers are arranged into two parallel rows.

4. A roller bearing as defined in claim 3, wherein the rollers are oriented face-to-face.

5. A roller bearing as defined in claim 3, wherein the cage is constructed of two axially separate parts capable of independent rotation about the same axis.

6. A roller bearing as defined in claim 1, wherein the bearing races include lubrication holes for the passage of lubricating oil.

7. A roller bearing having:
    an outer ring with an inner circumferential surface defining an outer race;
    an inner ring with an outer circumferential surface defining an inner race, the inner ring being located concentrically within the outer ring such that the two rings define an annular space between them;
    a first set of generally cylindrical, tapered rollers rolling in a first orbit, each roller having a large diameter end face and a small diameter end face connected by a rolling surface of the roller and located in the annular space;
    a second set of generally cylindrical, tapered rollers rolling in a second orbit, each roller having a large diameter end face and a small diameter end face connected by a rolling surface of the roller and located in the annular space; and load means for reacting roller axial loads from the first set of rollers to the second set of rollers and for keeping the rollers separated from each other.

8. A roller bearing as defined in claim 7, wherein the first orbit and the second orbit are axially separated along the bearing axis.

9. A bearing as defined in claim 7, wherein the first set of rollers and second set of rollers roll about the same orbit, and are oppositely inclined.

10. A bearing as defined in claim 7, wherein the load means comprises a slotted cage that includes a plurality of slots in each of which it receives one of the rollers.

11. A bearing as defined in claim 10, wherein the cage comprises at least two axially separate portions.

* * * * *